United States Patent [19]

Kobayashi et al.

[11] Patent Number: 5,661,621
[45] Date of Patent: Aug. 26, 1997

[54] MAGNETORESISTIVE HEAD

[75] Inventors: Kazuo Kobayashi; Hideyuki Kikuchi; Hitoshi Kishi; Mitsuru Otagiri, all of Kanagawa, Japan

[73] Assignee: Fujitsu Limited, Kawasaki, Japan

[21] Appl. No.: 509,600

[22] Filed: Jul. 31, 1995

[30] Foreign Application Priority Data

Sep. 8, 1994 [JP] Japan .................................. 6-214846

[51] Int. Cl.⁶ ........................................................ G11B 5/39
[52] U.S. Cl. ................................................................ 360/113
[58] Field of Search ........................ 360/113; 324/252; 338/32 R

[56] References Cited

U.S. PATENT DOCUMENTS

| | | | |
|---|---|---|---|
| 5,206,590 | 4/1993 | Dieny et al. | 324/252 |
| 5,287,238 | 2/1994 | Baumgart et al. | 360/113 |
| 5,452,163 | 9/1995 | Coffey et al. | 360/113 |

FOREIGN PATENT DOCUMENTS

| | | |
|---|---|---|
| 4-280483 | 10/1992 | Japan . |
| 5-28436 | 2/1993 | Japan . |
| 5-242436 | 9/1993 | Japan . |
| 6-60333 | 3/1994 | Japan . |
| 6-60336 | 3/1994 | Japan . |
| 6-90038 | 3/1994 | Japan . |

*Primary Examiner*—John H. Wolff
*Attorney, Agent, or Firm*—Greer, Burns & Crain, Ltd.

[57] ABSTRACT

A magnetoresistive head used for reading information signals from a magnetic recording medium using a spin valve magnetoresistance effect, comprises a first ferromagnetic layer and a second ferromagnetic layer both are separated by a first nonmagnetic metal layer, a hard magnetic layer formed so as to contact to the second ferromagnetic layer, and a third ferromagnetic layer formed on the hard magnetic layer via a second nonmagnetic metal layer for shutting off exchange coupling and coupled to the second ferromagnetic layer and the hard magnetic layer by static magnetic combination.

9 Claims, 5 Drawing Sheets

MAGNETORESISTIVE HEAD

BACKGROUND OF THE INVENTION

1. Field of the Invention

The present invention relates to a magnetoresistive head and, more particularly, to a magnetoresistive head used for reading information signals from a magnetic recording medium using a spin valve magnetoresistance effect.

2. Description of the Prior Art

As an electromagnetic transducer used for reading information signals from a magnetic recording medium such as a hard disk, a magnetic card, a magnetic tape or the like, a magnetoresistive sensor (MR sensor) having high read sensitivity has been known.

The electromagnetic transducer having a sectional structure shown in FIG. 1A has been constructed by using such phenomenon that electric resistance is changed according to differences in the direction of magnetization of magnetic layers and the direction of electric current. In general, this phenomenon is called as anisotropic magnetoresistance effect (referred to as AMR hereinafter). The AMR devices have been disclosed in Patent Application Publications (KOKAIs) 5-217123, 5-325138, 5-182147 etc., for example.

In FIG. 1A, on a substrate 1 made of a magnetic shield material, an insulating layer 2, a soft magnetic layer 3, a nonmagnetic metal layer 4, and an MR layer 5 are formed in that order. A pair of conductor lead layers 6a, 6b are connected on both sides of the MR layer 5 so as to put a sense region A therebetween. Antiferromagnetic layers 7a, 7b are formed between the conductor lead layers 6a, 6b and the MR layer 5. The MR layer 5 is magnetized from one conductor lead layer 6a toward the other conductor lead layer 6b by exchange interaction between the MR layer 5 and the antiferromagnetic layers 7a, 7b.

In such MR device, a magnetic field is generated around the MR layer 5 by flowing a sense current I from one conductor lead layer 6a toward the other conductor lead layer 6b, so that a biasing magnetic field which is perpendicular to the direction of initial magnetization $M_S$ of the MR layer 5 is generated in the soft magnetic layer 3. The direction of magnetization $M_S$ of the MR layer 5 is inclined by the bias magnetic field in the soft magnetic layer 3. Since the magnetization $M_S$ of the MR layer 5 has a certain angle against the sense current I by the bias magnetic field, the electric resistance of the MR layer 5 has a linear response to an external magnetic field, as shown in FIG. 1B.

In the meanwhile, a nickel-iron (NiFe) film having a thickness of 200 Å to 500 Å has been known as a magnetic material constituting the MR layer 5. A MR ratio $\Delta \rho / \rho$ thereof is not so large as 2 to 3%. In order to improve a reading effect, a material having a larger MR ratio has been desired.

Recently, as one method of attaining a higher MR effect, the electromagnetic transducer using a spin valve magnetoresistance effect have been proposed in Patent Application Publication (KOKAI) 4-358310.

The electromagnetic transducer has a structure shown in FIGS. 2A and 2B, for example.

In FIGS. 2A and 2B, a first ferromagnetic layer 12, a nonmagnetic metal layer 13, a second ferromagnetic layer 14, and an antiferromagnetic film 15 are formed in that order on a substrate 11. All layers from the first ferromagnetic layer 12 to the antiferromagnetic film 15 are patterned to have a rectangular plan shape. In addition, a pair of conductor lead layers 16a, 16b are formed at a distance in the longitudinal direction on antiferromagnetic film 15. Thereby, the magnetoresistance effect type transducer has been completed.

The first ferromagnetic layer 12 is made of a soft magnetic material such as NiFe. The direction of magnetization of the second ferromagnetic layer 14 is fixed by exchange coupling caused by the antiferromagnetic layer 15 connected to the surface of the second ferromagnetic layers 14. The direction of magnetization $M_b$ of the second ferromagnetic layer 14 is perpendicular to the surface of the magnetic recording medium (not Shown). The direction of magnetization $M_a$ of the first ferromagnetic layer 12 is directed along the surface of the magnetic recording medium. Thus directions of magnetizations $M_a$ and $M_b$ intersect with each other.

Since a magnetic field H of the magnetic recording medium is generated in the direction perpendicular to the surface of the medium, the direction of magnetization $M_a$ of the first ferromagnetic layer 12 is rotated according to the direction and magnitude of the magnetic field H of the magnetic recording medium, so that a relative angle between the directions of magnetizations of the first and second ferromagnetic layers 12 and 14 can be changed. When the direction of magnetization $M_a$ of the first ferromagnetic layer 12 is in parallel to the direction of magnetization $M_b$ of the second ferromagnetic layer 14, the resistance value becomes minimum. When the direction of magnetization $M_a$ of the first ferromagnetic layer 12 is in parallel and in the reverse direction to the direction of magnetization $M_b$ of the second ferromagnetic layer 14, the resistance value becomes maximum. Like the above, the resistance values of the first and second ferromagnetic layers 12 and 14 can be changed according to the change in strength of the magnetic field H generated by the magnetic recording medium, and then the electric resistance can be converted into the voltage so as to read information.

In case there exists no magnetic field H generated by the magnetic recording medium, a wide dynamic range can be utilized if the relative angle between the directions of magnetizations of the first and second ferromagnetic layers 12 and 14 is 90 degree, and thus it is preferable as a starting point of the operation.

However, in the electromagnetic transducer using the spin valve magnetoresistance effect, an iron-manganese (FeMn) alloy has been known as material of the antiferromagnetic layer 15 generating the above exchange coupling. But, since the FeMn alloy has poor corrosion resistance, it is oxidized upon fabricating the electromagnetic transducer, so that the characteristic of the transducer is deteriorated.

As another method of fixing the magnetization of the second ferromagnetic layer 14, such method can also be considered that a ferromagnetic layer (not shown) which has high saturation coercive force and high electric resistance is arranged near the second ferromagnetic layer 14 so as to achieve the exchange coupling therebetween.

The ferromagnetic medium having high saturation coercive force has good corrosion resistance. Therefore, the deterioration of the characteristic of the transducer not occurred. No detailed technology thereof have been disclosed in the above Patent Application Publication (KOKAI) 4-358310.

However, the magnetization $M_a$ of the first ferromagnetic layer 12 is intensively affected by the leakage magnetic field generated from the side section of the ferromagnetic medium layer having high saturation coercive force. As a result, there has been caused such problem that sensitivity to the magnetic field H from the magnetic recording medium is significantly deteriorated.

SUMMARY OF THE INVENTION

An object of the present invention is to provide a magnetoresistance sensor capable of reducing influence of the leakage magnetic flux on the ferromagnetic layer, the direction of the magnetization of which is varied by the magnetic field generated by the magnetic recording medium.

According to an aspect of the present invention, the magnetoresistive head comprises: a first ferromagnetic layer the direction of magnetization of which is rotated by external magnetic field, a second ferromagnetic layer the direction of magnetization of which is fixed by exchange coupling of a hard magnetic layer, a third ferromagnetic layer coupled to both the second ferromagnetic layer and the hard magnetic layer by static magnetic combination. In this case, the third ferromagnetic layer is formed hot to couple to the hard magnetic layer by exchange coupling.

Consequently, most of magnetic flux generated by the second ferromagnetic layer and the hard magnetic layer are coupled to magnetic flux generated by the third ferromagnetic layer. Therefore, the direction of magnetization of the first ferromagnetic layer is scarcely affected by the leakage magnetic flux generated by the second ferromagnetic layer. As a result, if, upon forming films, the first and second ferromagnetic layers are magnetized in mutually perpendicular directions, such perpendicular directions of magnetizations thereof are held substantially in a state of no external magnetic field, and thus there is almost no reduction in the sensitivity to the magnetic field generated by the magnetic recording medium.

In this case, the film thickness of the third ferromagnetic layer may be set to have a value that is derived by dividing a sum, which is made by adding a product of saturation magnetization and a film thickness of the second ferromagnetic layer to a product of saturation magnetization and a film thickness of the hard magnetic layer, by saturation magnetization of the third ferromagnetic layer.

In addition, if there exists ferromagnetic combination between the first and second ferromagnetic layers, the film thickness of the third ferromagnetic layer may be formed so as to reduce ferromagnetic combination between the first and second ferromagnetic layers.

Further, if the magnetization bias generating means is provided to control magnetic domains of the first ferromagnetic layer, the first ferromagnetic layer is scarcely affected magnetically by other magnetic layers, and thus influences on the direction of magnetization of the first ferromagnetic layer by the leakage magnetic field and the ferromagnetic combination can be significantly decreased. As the magnetization bias generating means, there is a structure wherein the antiferromagnetic layer or the hard magnetic layer is formed at both ends of the sense area in the first ferromagnetic layer, for example.

According to another aspect of the present invention, since the magnetic recording apparatus employs the magnetoresistive head described above, magnetic interaction between the ferromagnetic layers in the transducer can be suppressed, and thus decrease of sensitivity etc. can be prevented.

DETAILED DESCRIPTION OF THE PREFERRED EMBODIMENTS

There will now be described preferred embodiments of the present invention hereinafter with reference to the accompanying drawings.

(First Embodiment)

Figure 3:
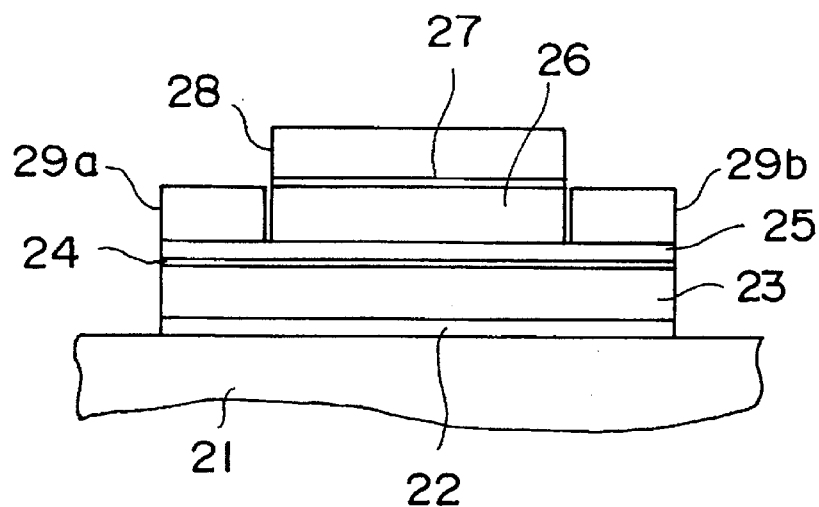
FIG. 3 is a front view showing a magnetoresistance transducer according to a first embodiment of the present invention viewed from a side of a magnetic recording medium.
Figure 4:
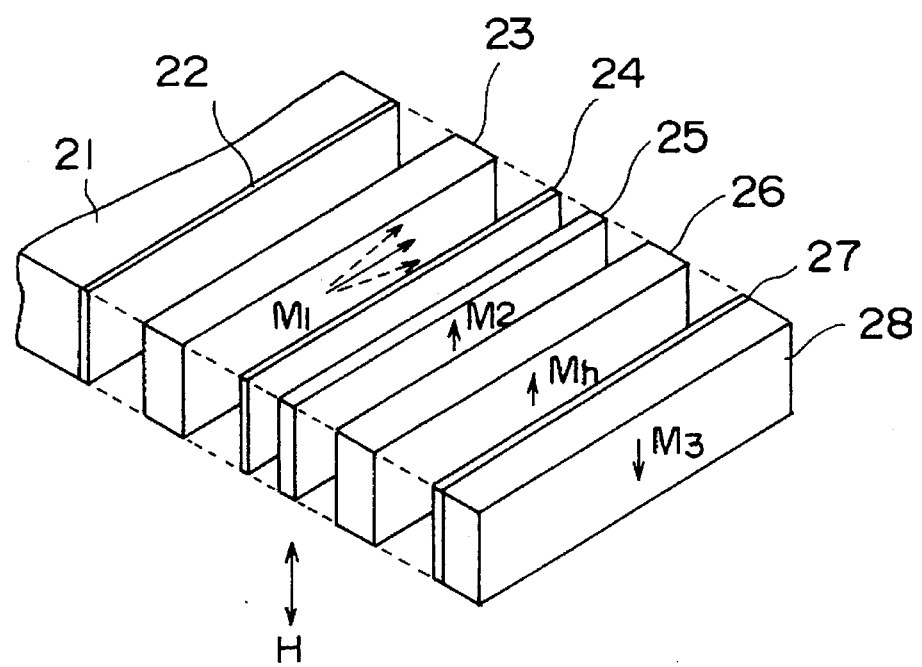
FIG. 4 is an exploded perspective view showing a laminated structure of the magnetoresistive head according to the first embodiment of the present invention.

FIGS. 3 and 4 are sectional views each showing a laminated structure of the magnetoresistive head according to a first embodiment of the present invention.

In FIG. 3, tantalum (Ta) film as a backing layer 22 having a thickness of 5 nm, $Ni_{81}Fe_{19}$ film as a first ferromagnetic layer 23 having a thickness of 9 nm, copper (Cu) film as a first nonmagnetic metal layer 24 having a thickness of 2.2 nm, cobalt (Co) film as a second ferromagnetic layers 25 having a thickness of 4 nm, $Co_{80}Cr_{10}Pt_{10}$ film as a hard magnetic layer 26 with high saturation coercive force having a thickness of 10 nm, and Ta film as a second nonmagnetic metal film 27 having a thickness of 1 nm are formed in that order on a (110) face of a silicon substrate 21. A third ferromagnetic layer 28 made of iron nitride (FEN) having large electric resistivity of 100 μΩcm in contrast to NiFe and large saturation magnetization is formed on the second nonmagnetic metal film 27.

Respective layers from the backing layer 22 to the third ferromagnetic layer 28 are formed in that order by sputtering, and are patterned to have a rectangular plan shape by use of a mask and ion milling. Layers from the first ferromagnetic layer 23 to the second ferromagnetic layer 25 have long sides larger than those of layers from the hard magnetic layer 26, the second nonmagnetic metal layer 27 and the third ferromagnetic layer 28 formed thereon. In addition, a pair of conductor leads 29a, 29b are formed by a lift-off method at both ends of the second ferromagnetic layer 27 in the longitudinal direction thereof.

The first ferromagnetic layer 23, the second ferromagnetic layer 25, the hard magnetic layer 26 and the third ferromagnetic layer 28 are magnetized respectively in the direction shown in FIG. 4. More particularly, the first ferromagnetic layer 23 is magnetized in the longitudinal direction (vertical direction). The second ferromagnetic layer 25 and the hard magnetic layer 26 are magnetized in the direction (lateral direction) intersected orthogonally with the direction of magnetization $M_1$ of the first ferromagnetic layer 23. In addition, the third ferromagnetic layer 28 is magnetized in the opposite direction (reverse and parallel direction) to the direction of magnetization $M_2$, $M_h$ of the second ferromagnetic layer 25 and the hard magnetic layer 26. These directions of magnetization $M_1$, $M_2$, $M_h$, $M_3$ are determined by external magnetic field applied when forming films by sputtering.

The magnetization $M_2$ of the second ferromagnetic layer 25 is fixed in the same direction as that of magnetization $M_h$ of the hard magnetic layer 26 by exchange interaction. In addition, the hard magnetic layer 26 and the third ferromagnetic layer 28, both having high saturation coercive force, are separated by forming the second nonmagnetic metal layer 27 therebetween to prevent exchange coupling. The first ferromagnetic layer 23 and the second ferromagnetic layer 25 are magnetically separated by the first nonmagnetic metal layer 24.

Figure 5:
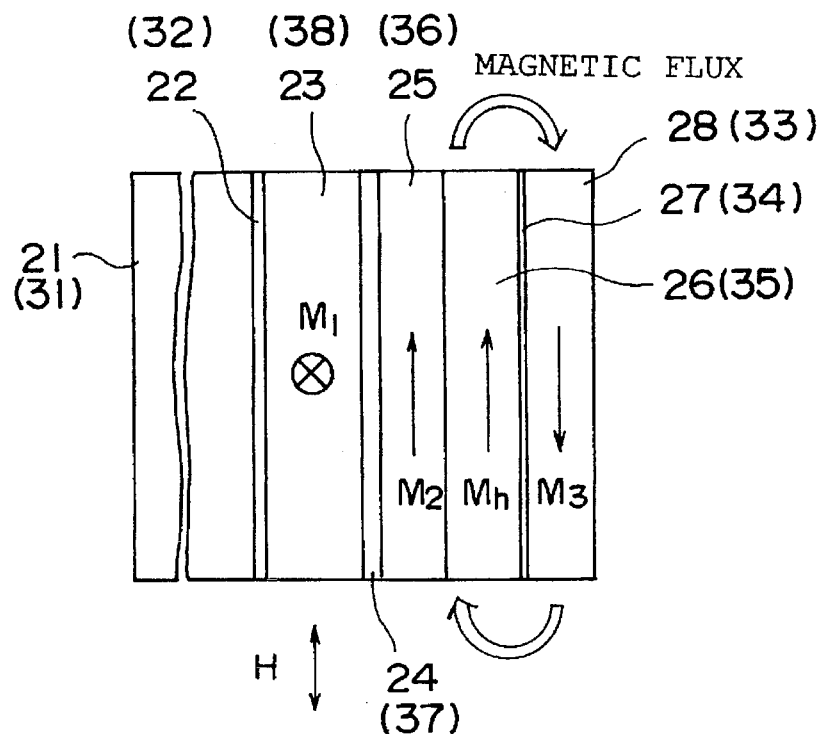
FIG. 5 is a side view showing the magnetoresistance transducer according to the first embodiment (and a second embodiment) of the present invention.

Under the condition given by following equation (1), the magnetic flux generated by the second ferromagnetic layer 25 and the hard magnetic layer 26 are coupled to magnetic flux generated by the third ferromagnetic layer 28 by static magnetic combination (see FIG. 5). Under this condition, the leakage magnetic flux generated by the second ferromagnetic layer 25 is scarcely applied to the first ferromagnetic layer 23. As a result, if there is no magnetic field generated by the magnetic recording medium (not shown), magnetization $M_1$, $M_2$ of the first and second ferromagnetic layers 23 and 25 are held to have mutually perpendicular directions.

$$M_{s2} \times t_2 + M_{sh} \times t_h = M_{s3} \times t_3 \quad (1)$$

where $M_{s2}$ is saturation magnetization of the second ferromagnetic layer 25, $t_2$ is the film thickness of the layer 25, $M_{sh}$ is saturation magnetization of the hard magnetic layer 26, $t_h$ is the film thickness of the layer 26, $M_{s3}$ is saturation magnetization of the third ferromagnetic layer 27, and $t_3$ is the film thickness of the layer 27.

As saturation magnetization of the materials of the above ferromagnetic layers, $Ni_{81}Fe_{19}$ has 10000 (4 $\pi M_{s1}$) gauss, Co has 18000 (4 $\pi M_{s2}$) gauss, $Co_{80}Cr_{10}Pt_{10}$ has 7000 (4 $\pi M_{sh}$) gauss, and FeN has 20000 (4 $\pi M_{s3}$) gauss. Accordingly, in order to hold the magnetization of the first and second ferromagnetic layers 23 and 25 to have mutually perpendicular directions, the third ferromagnetic layer 28 may be set to have a following film thickness $t_3$ based on the relation between above condition and equation (1).

$$\begin{aligned}
t_3 &= [M_{s2} \times t_2 + M_{sh} \times t_h]/M_{s3} \\
&= [(18000 \times 4/4\pi) + (7000 \times 10/4\pi)]/(20000/4\pi) \\
&= 7.1 \text{ nm}
\end{aligned}$$

In the spin valve magnetoresistance device having the layer structure constructed above, a sense current as a fixed current flows between a pair of conductor leads 29a, 29b. In a state where the magnetic field H generated by the magnetic recording medium is applied to the first ferromagnetic layer 23, the electric resistance is reduced as the magnetic component in the same direction as magnetization of the first and second ferromagnetic layers 23 and 25 is increased, whereas the electric resistance is increased as the magnetic component in the reverse direction to magnetization thereof is increased. Thereby, a voltage generated between the conductor leads 29a, 29b is changed and information is read out.

In this case, in case there applied no magnetic field generated from the magnetic recording medium, magnetic lines of force passing through side portions of the hard magnetic layer 26 and the second ferromagnetic layer 25 are passed mainly into and out of side portions of the third ferromagnetic layer 28. As a result, the leakage magnetic fields generated from the hard magnetic layer 26 and the second ferromagnetic layer 25 seldom enter into the first ferromagnetic layer 23.

Consequently, since, in a state where there exists no magnetic field generated from the magnetic recording medium, the direction of magnetization $M_1$ of the first ferromagnetic layer 23 is substantially at right angles with the direction of magnetization $M_2$ of the second ferromagnetic layer 25, the sensitivity to the magnetic field from the magnetic recording medium can be improved.

Unless the third ferromagnetic layer 28 is provided, the first ferromagnetic layer 23 is magnetized by the leakage magnetic fields generated from the hard magnetic layer 26 and the second ferromagnetic layer 25 in the direction opposite to those leakage magnetic fields. Thus, an angle between magnetization of the first ferromagnetic layer 23 and the second ferromagnetic layer 25 has become 180 degree.

On the contrary, in case ferromagnetic combination exists between the first ferromagnetic layer 23 and the second ferromagnetic layer 25, it is possible that the direction of magnetization of the first ferromagnetic layer 23 is intersected with the direction of magnetization of the second ferromagnetic layer 25 orthogonally by adjusting the film thickness of the third ferromagnetic layer 28. In other words, by forming the third ferromagnetic layer 28 to have its film thickness thicker than a value given by equation (1), magnetic combination between the first ferromagnetic layer 23 and the third ferromagnetic layer 28 can be increased, i.e., emphasized whereas magnetic combination between the first ferromagnetic layer 23 and the second ferromagnetic layer 25 can be decreased, i.e., weakened.

Note that, as the magnetic material of the above described third ferromagnetic layer 28, materials such as sendust (FeAlSi) and cobalt system amorphous metal in addition to iron nitride (FEN), which have higher saturation magnetization and larger electric resistivity than those of NiFe, may be selected.

(Second Embodiment)

Figure 6:
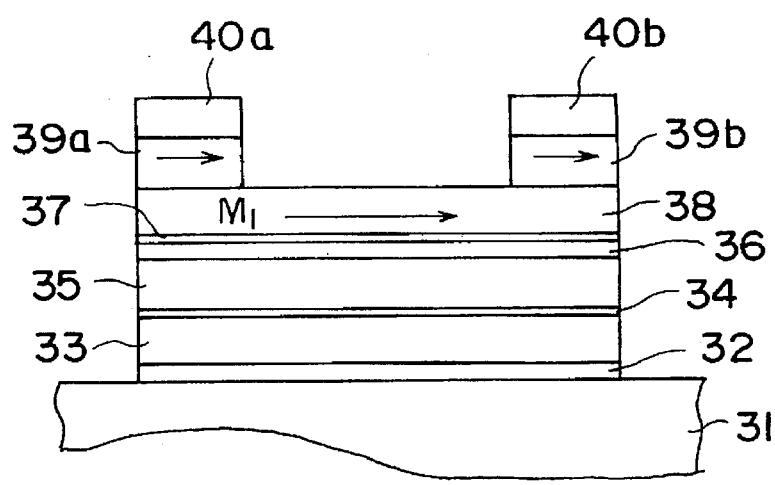
FIG. 6 is a front view showing a magnetoresistance transducer according to a second embodiment of the present invention viewed from a side of a magnetic recording medium.

FIG. 6 is a sectional view showing a magnetoresistive head according to a second embodiment of the present invention. In the second embodiment, since a laminated layer structure which has reverse layer order in contrast to that in the first embodiment is adopted, components having the same characteristic as in the first embodiment are indicated by the same names as in the first embodiment for easy understanding.

In FIG. 6, a backing layer 32 made of Ta, a third ferromagnetic layer 33 made of FeN, a second nonmagnetic layer 34 made of Ta, a hard magnetic layer 35 made of $Co_{80}Cr_{10}Pt_{10}$, a second ferromagnetic layer 36 made of Co, a first nonmagnetic metal layer 37 made of Cu, and a first ferromagnetic layer 38 made of $Ni_{81}Fe_{19}$ are formed in that order on a (110) face of a silicon substrate 31.

Respective layers from the backing layer 32 to the first ferromagnetic layer 38 are formed in that order by sputtering, and are patterned to have a rectangular plan shape by use of a mask and ion milling. In addition, while being contacted to the surface of the first ferromagnetic layer 38, two hard magnetic layers 39a, 39b made of CoCrTa are formed at both ends on a surface of the first ferromagnetic layer 38 in the longitudinal direction thereof. In addition, a pair of conductor leads 40a, 40b made of gold are formed on the hard magnetic layers 39a, 39b. The hard magnetic layers 39a, 39b and the conductor leads 40a, 40b are formed by a lift-off method so as to extend out of the first ferromagnetic layer 38. A sense area is formed so as to be put between two hard magnetic layers 39a, 39b.

Under the same conditions as identical name layers in the first embodiment, film thicknesses of respective layers from the third ferromagnetic layer 33 to the first ferromagnetic layer 38 are formed. The same name layers as those in the first embodiment have the same direction of magnetization as in the first embodiment. Two hard magnetic layers 39a, 39b formed on the first ferromagnetic layer 38 to sandwich the sense area are magnetized in the direction perpendicular to the direction of magnetization $M_2$. Thereby, since bias magnetic field caused by the hard magnetic layers 39a, 39b are applied to the first ferromagnetic layer 38, influences of the leakage magnetic field caused by the second ferromagnetic layer 36 can be reduced. Moreover, since, as described in the first embodiment, such effect that influences of the leakage magnetic field caused by the third ferromagnetic layer 33 may be reduced can also be attained, the directions of magnetization of the first ferromagnetic layer 38 and the second ferromagnetic layer 36 are firmly intersected orthogonally in a state where there exists no magnetic field H generated by the magnetic recording medium.

Note that antiferromagnetic layers may be employed instead of the hard magnetic layers 39a, 39b. Such layers have enough saturation magnetization and enough film thicknesses to generate the bias magnetic field which is sufficient to keep the first ferromagnetic layer 38 in a single magnetic domain state.

As has been described above, according to the magnetoresistive head, since a first ferromagnetic layer the direction of magnetization of which is rotated by external magnetic field, a second ferromagnetic layer the direction of magnetization of which is fixed by exchange coupling of a hard magnetic layer, and a third ferromagnetic layer coupled to both the second ferromagnetic layer and the hard magnetic layer by static magnetic combination are provided, most of magnetic flux generated by the second ferromagnetic layer and the hard magnetic layer are coupled to magnetic flux generated by the third ferromagnetic layer, and therefore the direction of magnetization of the first ferromagnetic layer is scarcely affected by the leakage magnetic flux generated by the second ferromagnetic layer. As a result, the perpendicular directions of magnetizations of the first and second ferromagnetic layers are held substantially identically and thus reduction in the sensitivity to the magnetic field generated by the magnetic recording medium can be prevented.

In this case, the film thickness of the third ferromagnetic layer may be set to have a value that is derived by dividing a sum, which is made by adding a product of saturation magnetization and a film thickness of the second ferromagnetic layer to a product of saturation magnetization and a film thickness of the hard magnetic layer, by saturation magnetization of the third ferromagnetic layer. Thereby, magnetic balance between them can be attained.

In addition, since magnetic influences of the third ferromagnetic layer on the second ferromagnetic layer can be increased by adjusting the film thickness of the third ferromagnetic layer, the ferromagnetic combination between the first and second ferromagnetic layers can be reduced if there exists the ferromagnetic combination between the first and second ferromagnetic layers.

Moreover, if the magnetization bias generating means is provided to control the magnetic domains of the first ferromagnetic layer, the first ferromagnetic layer is scarcely affected magnetically by other magnetic layers, and influences on the direction of magnetization of the first ferromagnetic layer by the leakage magnetic field and the ferromagnetic combination can be significantly decreased.

(Third Embodiment).

Figure 7A:
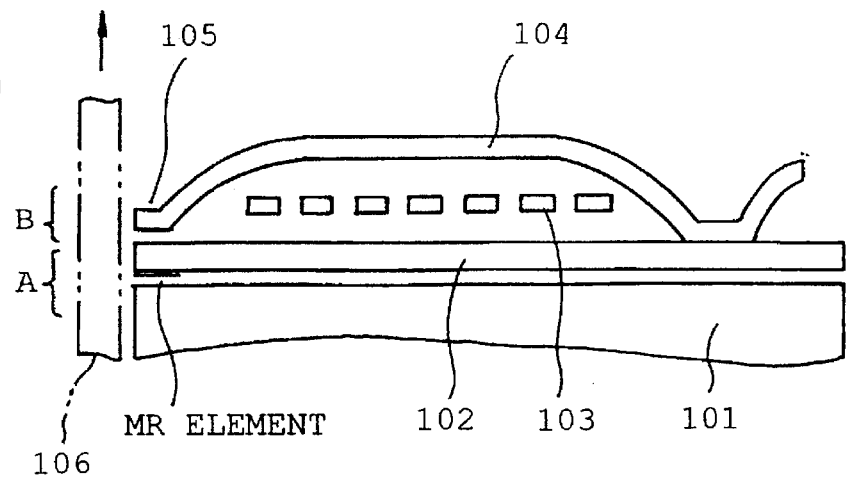
FIG. 7A is a side view showing a common type magnetic recording apparatus in which the MR device according to the embodiment of the present invention is incorporated.
Figure 7B:
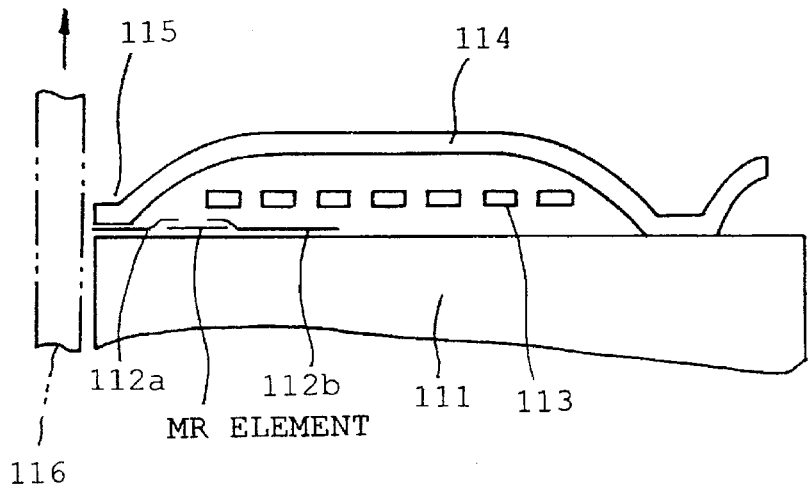
FIG. 7B is a side view showing an in-gap type magnetic recording apparatus having a flux guide, in which the MR device according to the embodiment of the present invention is incorporated.
Figure 7C:
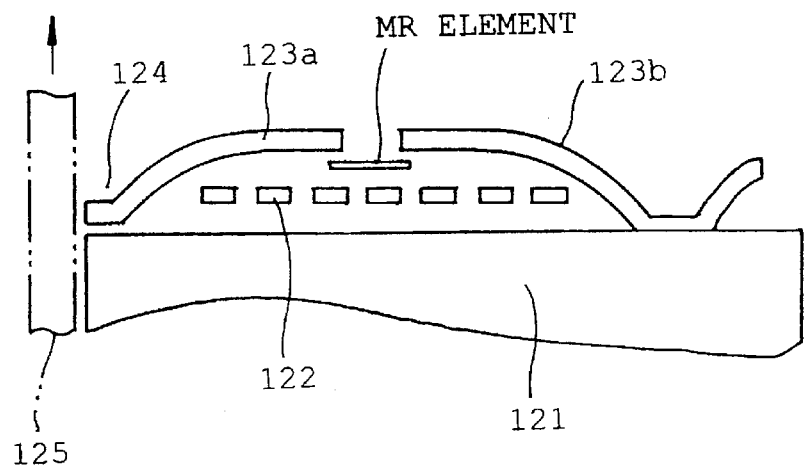
FIG. 7C is a side view showing a yoke type magnetic recording apparatus in which the MR device according to the embodiment of the present invention is incorporated.

Next, with reference to FIGS. 7A to 7C, a magnetic recording apparatus according to the embodiment of the present invention into which the MR element described above is incorporated will be explained. FIGS. 7A to 7C are sectional views showing a magnetic head portion of the magnetic recording apparatus.

FIG. 7A shows a composite type magnetic recording apparatus. Aria portion denotes a reproducing head, and a B portion denotes a recording head. A soft magnetic layer 102 is commonly used as a magnetic shield of the reproducing head and a magnetic pole of the recording head.

As shown in FIG. 7A, in the reproducing head portion, soft magnetic layers 101, 102 used as the magnetic shield are positioned to oppose to each other at a distance. The MR element described above is put into a gap of a portion 105 facing to a magnetic recording medium 106. A leakage magnetic field generated from the magnetic recording medium 106 can be directly detected.

In the reproducing head portion, soft magnetic layers 102, 104 used as the magnetic pole are positioned to oppose to each other at a distance. A coil 103 which generates magnetic flux passing through the soft magnetic layers 102, 104 is formed in a gap of the soft magnetic layers 102, 104. By generating the leakage magnetic field from the gap of the facing portion 105 by this magnetic flux, the magnetic recording medium 106 can record various information.

FIG. 7B shows an in-gap type magnetic recording apparatus. As shown in FIG. 7B, soft magnetic layers 111, 114 used as the magnetic pole are positioned to oppose to each other at a distance. The MR element described above is put into a gap of a portion 115 facing to a magnetic recording medium 116. A coil 113 which generates magnetic flux passing through the soft magnetic layers 111, 114 is formed in a gap of the soft magnetic layers 111, 114.

In order to avoid corrosion or direct contact to the magnetic recording medium, the MR element is positioned inside of the magnetic head, without being protruded to the portion 115 facing to the magnetic recording medium 116. A flux guide 112a which is electrically isolated from the MR element and magnetically coupled thereto is protruded t the facing portion 115. The leakage magnetic field generated by the magnetic recording medium 116 is entered into the flux guide 112a and then detected by the MR element. At the other end of the MR element, another flux guide 112b which is electrically isolated from the MR element and magnetically coupled thereto is formed to guide the magnetic flux from the MR element to the soft magnetic layers 111, 114.

FIG. 7C shows a yoke type magnetic recording apparatus. As shown in FIG. 7C, soft magnetic layers 121, 123a and 123b used as the magnetic pole are positioned to oppose to each other at a distance. A coil 122 which generates magnetic flux passing through the soft magnetic layers 121, 123a and 123b is formed in a gap of the soft magnetic layers 121, 123a and 123b. The MR element is positioned at an end of the soft magnetic layers 123a and 123b such that it is electrically isolated from the soft magnetic layers 123a and 123b and magnetically coupled thereto. The leakage magnetic field is generated from the gap of the facing portion 124 by the magnetic flux which is generated by the coil 122 and passes through the soft magnetic layers 121, 123a and 123b, so that the magnetic recording medium 125 can record various information.

In the magnetic recording apparatus shown in FIGS. 7A to 7C, a substrate on which the magnetic head is formed and insulating films between the soft magnetic layers etc. are omitted.

According to the above magnetic recording apparatus, since the MR element according to the first and second embodiments are used, magnetic interaction between the ferromagnetic layers in the MR element can be suppressed and thus decrease of the sensitivity of the magnetic recording apparatus etc. can be prevented.

Note that the MR element according to the present invention may be used in various magnetic recording apparatus as well as the above magnetic recording apparatus.

Moreover, the MR element may be used in a reproducing-only magnetic recording apparatus.

What is claimed is:

1. A magnetoresistive head comprising:

a first ferromagnetic layer and a second ferromagnetic layer, between which a first nonmagnetic metal layer is interposed;

a hard magnetic layer formed so as to contact said second ferromagnetic layer for fixing a magnetization direction of said second ferromagnetic layer by a first exchange coupling between the hard magnetic layer and the second ferromagnetic layer;

a third ferromagnetic layer formed on said hard magnetic layer via a second nonmagnetic metal layer which is provided to shut off a second exchange coupling between the third ferromagnetic layer and the hard magnetic layer, said third ferromagnetic layer being coupled to said second ferromagnetic layer and said hard magnetic layer by static magnetic coupling.

2. A magnetoresistive head according to claim 1, wherein said hard magnetic layer is formed by a cobalt system alloy.

3. A magnetoresistive head according to claim 1, wherein said third ferromagnetic layer has a film thickness that is derived by dividing a sum, which is made by adding a product of saturation magnetization and a film thickness of said second ferromagnetic layer to a product of saturation magnetization and a film thickness of said hard magnetic layer, by saturation magnetization of said third ferromagnetic layer.

4. A magnetoresistive head according to claim 1, wherein said third ferromagnetic layer has a film thickness so as to reduce ferromagnetic combination between said first and second ferromagnetic layers.

5. A magnetoresistive head according to claim 1, wherein said third ferromagnetic layer is made of magnetic material which has higher saturation magnetization and higher electric resistance than those of nickel-iron alloy.

6. A magnetoresistive head according to claim 5, wherein said magnetic material of said third ferromagnetic layer is formed of one selected from a group consisting of iron nitride (FeN), sendust (FeAlSi), and cobalt system amorphous metal.

7. A magnetoresistive head according to claim 1, further comprising means for generating a biasing magnetic field in the direction perpendicular to the direction of magnetization of said second ferromagnetic layer, and holding magnetic domains of said first ferromagnetic layer in a state of single magnetic domain.

8. A magnetoresistive head according to claim 7, wherein said magnetization bias generating means is made of one selected from a group consisting of antiferromagnetic layer and hard magnetic layer and is formed at both ends of said first ferromagnetic layer in the direction of magnetization thereof.

9. A magnetic recording apparatus having said magnetoresistive head described in claim 1.

* * * * *

UNITED STATES PATENT AND TRADEMARK OFFICE
CERTIFICATE OF CORRECTION

PATENT NO. : 5,661,621

DATED : August 26, 1997

INVENTOR(S) : Kobayashi et al.

Page 1 of 4

It is certified that error appears in the above-indentified patent and that said Letters Patent is hereby corrected as shown below:

Column 1, line 21, before "anisotropic" delete --as--.

Column 1, line 56, delete "have" and insert --has-- therefor.

Column 2, line 11, delete "Shown" and insert --shown-- therefor.

Column 2, line 39, delete "degree" and insert --degrees-- therefor.

Column 2, line 57, after "transducer" insert --has--.

UNITED STATES PATENT AND TRADEMARK OFFICE
CERTIFICATE OF CORRECTION

PATENT NO. : 5,661,621
DATED : August 26, 1997
INVENTOR(S) : Kobayashi et al.

It is certified that error appears in the above-indentified patent and that said Letters Patent is hereby corrected as shown below:

Column 3, line 15, delete "hot" and insert -- not-- therefor.

Figure 1A:
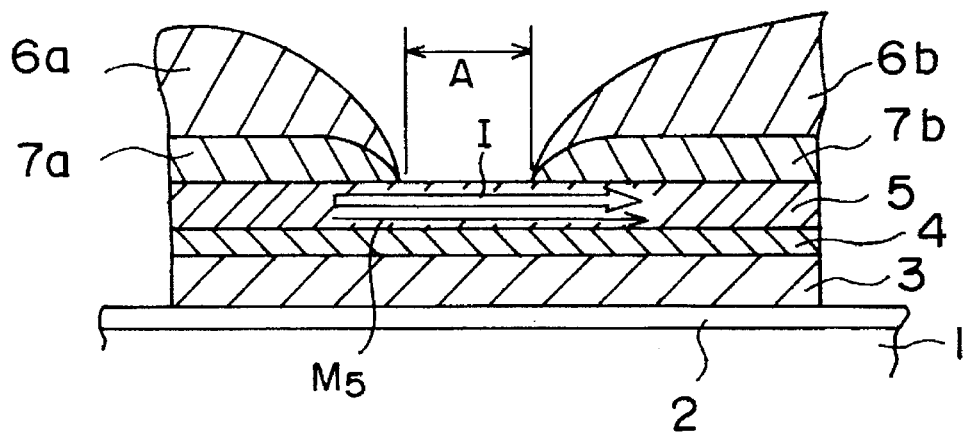
FIG. 1A is a sectional view showing an example of a conventional anisotropic magnetoresistance device.
Figure 1B:
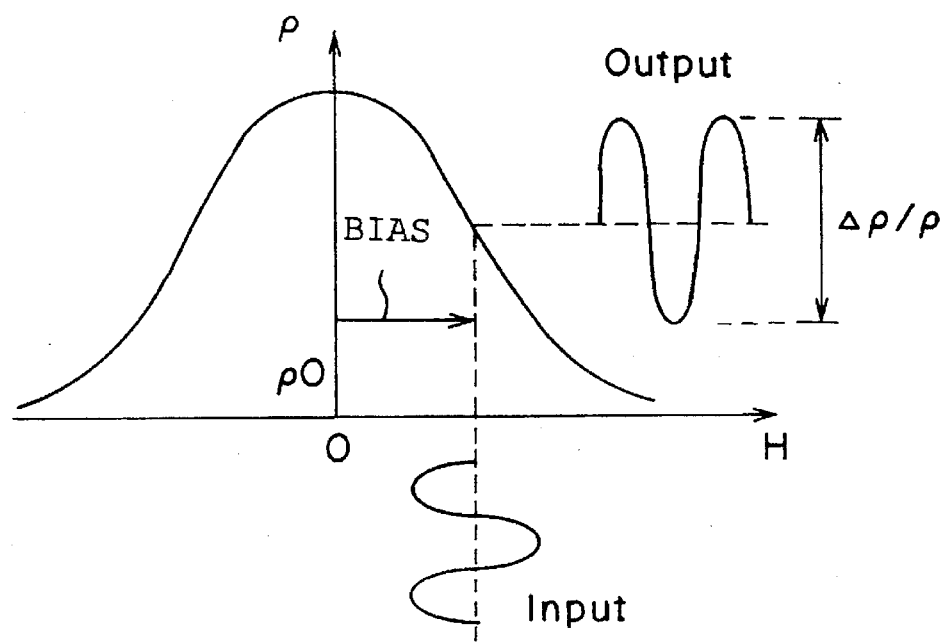
FIG. 1B is a characteristic view showing a relation between an external magnetic field and electric resistivity of the conventional device in FIG. 1A.
Figure 2A:
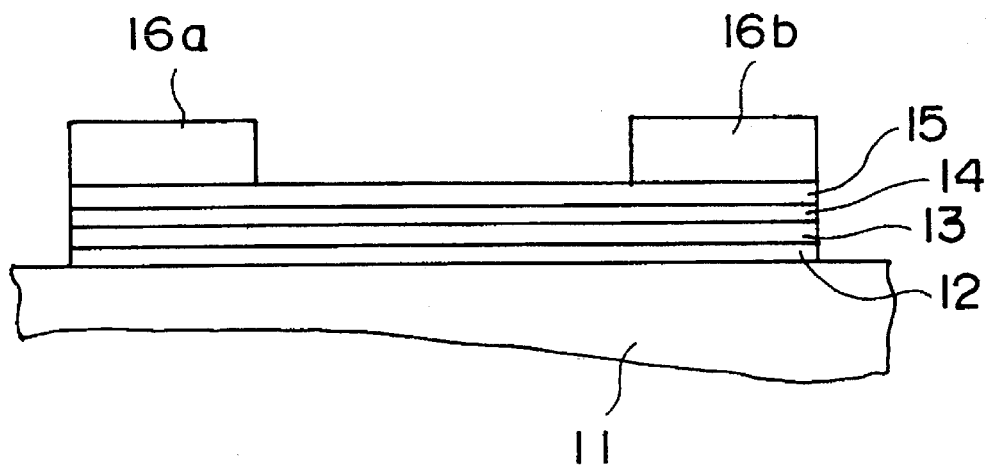
FIG. 2B is an exploded perspective view of the conventional device in FIG. 2A.
Figure 2B:
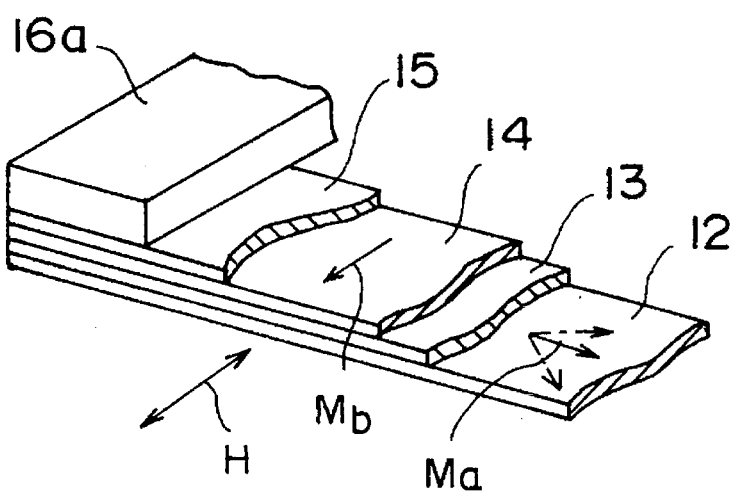

Column 4, line 1, before "Fig. 2B is" insert -- Fig. 2A is a sectional view showing an example of a conventional spin valve magnetoresistance device;--.

Column 4, line 42, delete "layers" and insert -- layer-- therefor.

Column 4, line 48, delete "FEN" and insert -- FeN-- therefor.

UNITED STATES PATENT AND TRADEMARK OFFICE
CERTIFICATE OF CORRECTION

PATENT NO. : 5,661,621

DATED : August 26, 1997

INVENTOR(S) : Kobayashi et al.

It is certified that error appears in the above-indentified patent and that said Letters Patent is hereby corrected as shown below:

Column 4, line 49, delete bold "100" and insert plain text --100-- therefor.

Column 5, line 57, delete "as" and insert --at-- therefor.

Column 6, line 41, delete "FEN" and insert --FeN-- therefor.

Column 8, line 13, delete "Aria" and insert --An A-- therefor.

Column 8, line 19, after "oppose" delete --to--.

UNITED STATES PATENT AND TRADEMARK OFFICE
CERTIFICATE OF CORRECTION

PATENT NO. : 5,661,621
DATED : August 26, 1997
INVENTOR(S) : Kobayashi et al.

It is certified that error appears in the above-indentified patent and that said Letters Patent is hereby corrected as shown below:

Column 8, line 25, after "oppose" delete --to--.

Column 8, line 34, after "oppose" delete --to--.

Column 9, line 9, after "thus" insert --a--.

Signed and Sealed this

Twenty-fifth Day of August, 1998

Attest:

BRUCE LEHMAN

Attesting Officer

Commissioner of Patents and Trademarks